(12) United States Patent
Kuenzler et al.

(10) Patent No.: US 6,367,611 B1
(45) Date of Patent: Apr. 9, 2002

(54) PART FEEDING SYSTEM

(75) Inventors: Glenn H. Kuenzler, Macedonia; Edward J. Balaschak, Avon, both of OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/643,340

(22) Filed: Aug. 22, 2000

(51) Int. Cl.[7] .............................................. B65G 47/14
(52) U.S. Cl. ...................... 198/396; 198/389; 198/392; 198/443
(58) Field of Search ................... 198/396, 392, 198/443, 389, 382, 383, 384, 390, 393, 394, 397.02, 397.03; 221/163

(56) References Cited

U.S. PATENT DOCUMENTS

| | | | | |
|---|---|---|---|---|
| 4,673,077 A | * | 6/1987 | Taniguchi | ................... 198/393 |
| 5,427,224 A | * | 6/1995 | Suehara et al. | ............. 198/396 |
| 5,702,028 A | * | 12/1997 | Shirodera | .................... 221/166 |
| 6,129,629 A | * | 10/2000 | Dammann et al. | ............ 460/67 |

* cited by examiner

Primary Examiner—Christopher P. Ellis
Assistant Examiner—Khoi H. Tran

(57) ABSTRACT

A generally cylindrically shaped feeder having a feeder housing defining a cavity bounded by an inner surface having a plurality of spiral grooves spaced apart from each other and extending from a front end to a back end of the inner surface of the feeder housing. A generally cone shaped end cap is dimensioned such that a cone base engages the back end of said cylindrically shaped feeder housing. The cap has an inner surface which faces the cavity and forms a plurality of grooves cut into the inner surface which extend radially from a cone top to the cone base and are spaced about a periphery of the end cap to align with corresponding spiral grooves in the feeder housing. A drive rotates the cylindrically shaped feeder about an axis of rotation to move parts along the pluralite of spiral grooves to the pluralite of radial grooves for delivery to a discharge zone at the top of said cone.

14 Claims, 3 Drawing Sheets

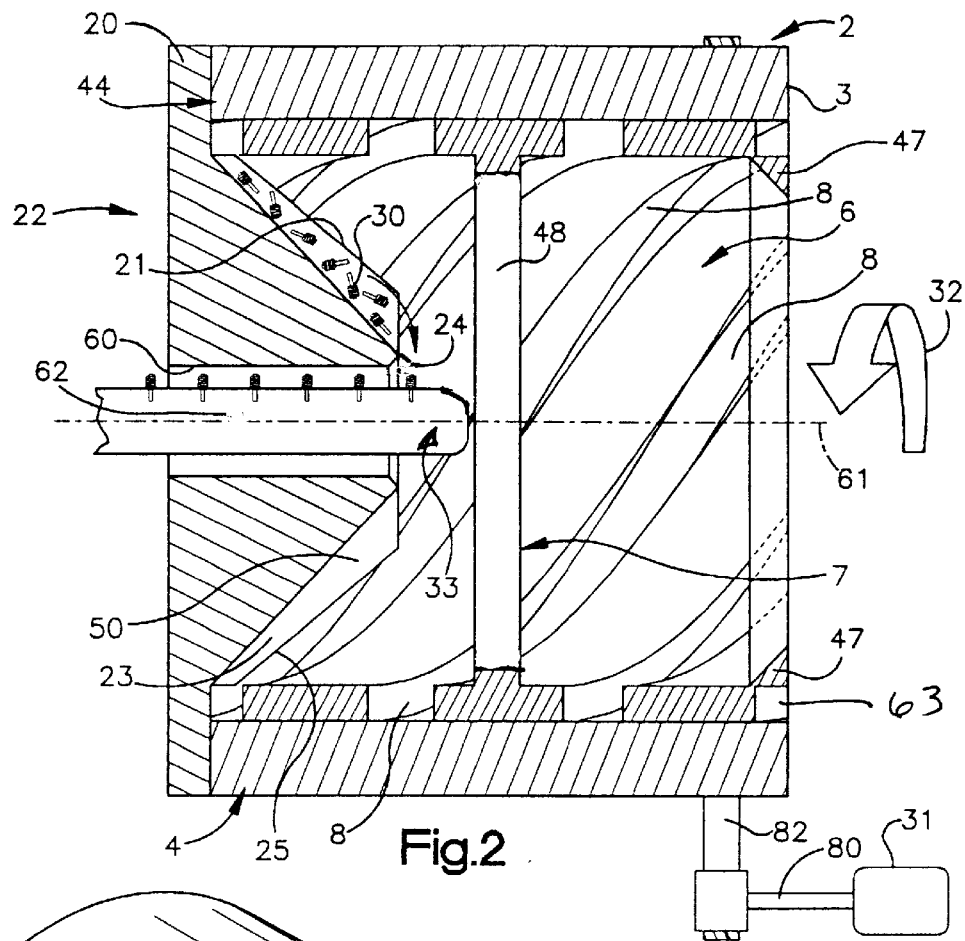
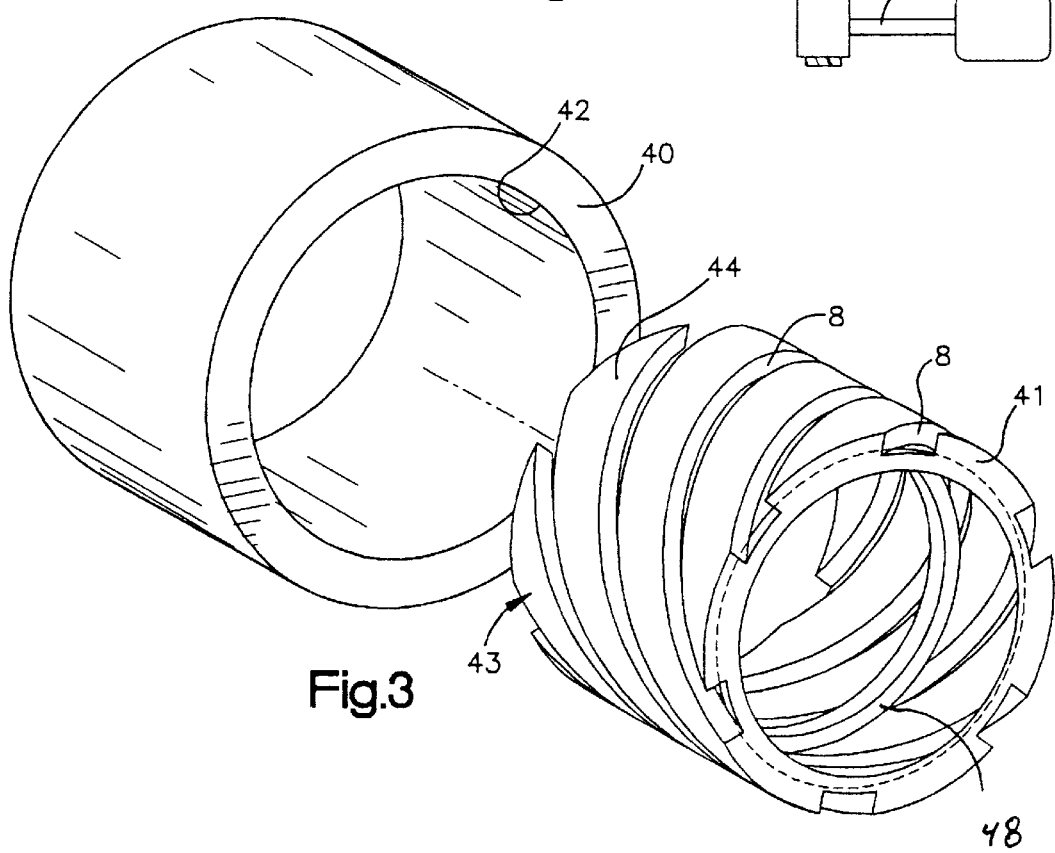

PART FEEDING SYSTEM

FIELD OF THE INVENTION

The present invention concerns an apparatus and method for isolating parts or other objects for later use. More particularly, the present invention is for an apparatus and method for creating a stream of parts or other objects at a point where they may be gathered and isolated.

BACKGROUND ART

As part of many manufacturing processes, it is necessary to isolate a single part from a container containing a large supply of those parts for use in the manufacturing process. The prior art discloses vibrating mechanisms that are employed to arrange the parts into an array from which a gathering device captures and removes a part for use in the manufacturing process. The most common of these vibrating mechanisms is a bowl feeder which consists of a bowl shaped container filled with parts to be used in the manufacturing process. The bowl feeder includes a spiral track that runs from the bottom of the container to the top of the container around an inner surface of the bowl. When the bowl is vibrated the parts move up the spiral track and are delivered to the top of the bowl, possibly in a particular orientation.

Vibrating mechanisms have difficulty handling small parts. Small parts have a tendency to bounce excessively with the vibration of the bowl and are prone to bounce out of the container, fall off the vibrating track, and have a tendency to jam the machine.

In order to eliminate these difficulties, the prior art discloses isolating the parts by pouring large quantities of parts in a continuous cascade over the gathering device which captures and removes the required parts. This approach avoids the problems created by vibrating feeders but it requires a large quantity of parts and a mechanism for recycling non-captured parts back into the cascade. Effectively, such a system requires a relatively large amount of parts to "prime" the system to create a continuous cascade. The longer the cycle time of the parts through the feeder system, the more parts are necessary to "prime" the system.

In addition, since the parts fall into the gathering device in a random fashion, there is a relatively low probability that a particular part will be gathered. Instead, this method relies upon a large volume of parts cascading over the gathering device to ensure that the required number of parts are captured and removed, increasing the number of parts necessary to operate the system.

In applications where the parts involved are relatively expensive, the cascade system requires a large capital investment in parts needed to create a continuous cascade to be captured relative to the number of parts are actually captured. Where the parts are expensive, the cascade method can be burdensome or even cost prohibitive for some manufacturing process.

SUMMARY OF THE INVENTION

The present invention relates to an apparatus and method for creating a cascade of parts at a specified location where they are captured, isolated and removed by a gathering device while greatly shortening the time necessary to recycle parts.

A part feeder comprising constructed in accordance with the invention includes a generally cylindrically shaped feeder having a feeder housing defining a cavity bounded by an inner surface having one or more spiral grooves extending from a front end to a back end of the inner surface of the feeder housing. A generally cone shaped end cap is dimensioned such that a cone base engages the back end of said cylindrically shaped feeder housing. The end cap has an inner surface which faces the cavity which defines one or more parts delivery grooves that extend into the inner surface which extend radially from a cone top to the cone base. A drive rotates the cylindrically shaped feeder about an axis of rotation to move parts along the plurality of spiral grooves to the one or more parts delivery grooves for delivery to a discharge zone at the end of said one or more parts delivery grooves.

A presently preferred embodiment of the invention includes a parts feeder having a generally cylindrically shaped parts feeder housing defining a cavity which is bounded by an inner surface having a plurality of spiral grooves. The grooves are spaced apart from each other and extend from a front end to a back end of the inner surface of the feeder housing. A cone shaped end cap which is dimensioned to engage the back end of said cylindrically shaped feeder housing has an inner surface and an outer surface with the inner surface forming a plurality of grooves cut into the inner surface of the cone. The grooves extend from a top of the cone to its base and are spaced about a periphery of the cone to align with corresponding spiral grooves in the feeder housing. A drive mechanism rotates both the cylindrically shaped feeder and the cone about an axis of rotation. This moves parts along the spiral grooves to the radial grooves in the cone for delivery to a discharge zone at the top of the cone.

The present invention also includes a method of isolating parts by inserting the parts to be isolated into the inner cavity of a cylindrically shaped feeder having spiral grooves which extend along an inner surface of the feeder. After the parts to be isolated are placed in the feeder, the feeder is rotated forcing the parts to move along the spiral grooves to the back of the feeder where they are moved into grooves aligning radially from the base to the top of the cone. As the cylindrical feeder continues to rotate, the parts, which are trapped in the grooves in the cone, rotate with the cone until they reach a position where they slide down the grove in which they are captured and fall through a discharge zone at the end of the cone. An interceptor may then be inserted into the stream of parts falling through the discharge zone and capture and remove some of the parts.

In addition, the present invention facilitates removal of the parts from the apparatus. By reversing the direction of the rotation of the cylindrically shaped feeder housing, the direction that the parts move in the feeder can also be reversed. The parts are forced by the spiral groves to the front of the feeder and out an open portion of the feeder housing. This process greatly facilitates unloading the parts and shortens the part change over time.

The present invention significantly shortens the time necessary to recycle the non-captured parts back into the cascade. The present invention, therefore, reduces the number of parts necessary to "prime" the system and the capital costs associated with those extra parts. In addition, the present invention facilitates removal of the parts from the apparatus reducing the time required to change the type of part being captured, isolated and removed.

These and other objects, advantages and features of the invention will become better understood from the accompanying detailed description of a preferred embodiment of the invention which is described in conjunction with the drawings.

BRIEF DESCRIPTION OF THE DRAWINGS

FIG. 2 is a section view of the FIG. 1 parts feeder;

FIG. 3 is an exploded perspective view showing component parts used in constructing a parts feeder housing;

DESCRIPTION OF THE EXEMPLARY EMBODIMENTS

Figure 1:
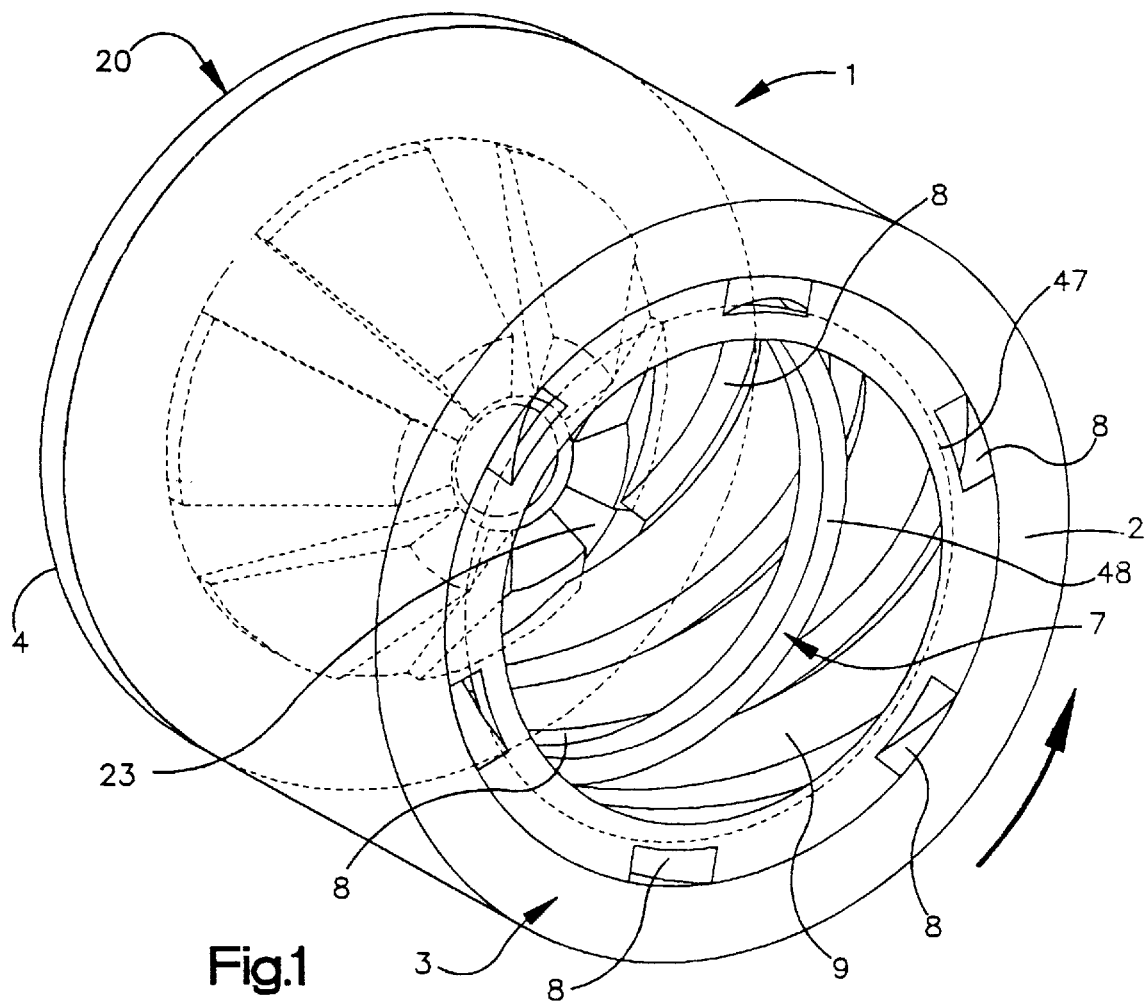
FIG. 1 is a perspective view of a parts feeder constructed in accordance with the present invention.

As depicted in FIGS. 1 and 2 of the drawings, the exemplary embodiment of the present invention includes a generally cylindrically shaped feeder 1 that includes a feeder housing 2, which has a front end 3, a back end 4, and an inner surface that bounds an inner region 7. The inner region 7 defines an inner cavity which contains a plurality of spiral grooves 8 which extend from the front end 3 to the back end 4 of the feeder housing 2. A generally cone shaped end cap 20 includes an outer generally planar end surface 22 and an inner surface 21 which is generally conical in shape. The inner surface 21 includes a series of radial grooves 23 that run from a truncated top 24 of the cone to a base of the cone. The end cap 20 engages the back end 3 of the feeder housing 2 such that the radial grooves 23 of the end cap are aligned with the spiral grooves 8 of the feeder housing.

A plurality of parts 30 are inserted into the inner cavity 7 and the feeder is rotated about a center axis 61. These parts collect at the bottom of the inner cavity 7 with some portion falling into one or more of the spiral grooves 8. The feeder 1 is rotated in a sense indicated by the arrow 32 by means of a motor 31 such that parts 30 that have fallen in the spiral grooves 8 will be moved by the spiral grooves 8 from the front end 3 to the back end 4 of the feeder housing 2. When the parts 30 reach the back end 4 of the feeder housing 2, a portion of the parts will move into a radial groove 23 defined by the end cap 20 at the point where a corresponding spiral groove 8 engages that groove 23. As the generally cylindrically shaped feeder 1 continues to rotate, the parts which have moved into the radial grooves 23 are trapped there and continue to move in the radial groove 23 until the radial groove 23 has rotated to a generally vertical orientation. When this orientation is reached, the parts 30 slide down the radial groove 23 and fall through the discharge zone 33. As the parts are delivered, a capture device 62 captures or catches the parts for use. Parts 30 which are not captured fall to the bottom of the feeder housing and are recycled back through the feeder mechanism until they are captured by the capture device 62.

The feeder housing 2 can be made from virtually any material. In the exemplary embodiments, the feeder is used to isolate small electrodes that are generally cylindrical in shape with a coil of wire on one end. In the exemplary embodiment, the feeder housing 2 is constructed of aluminum or anodized aluminum.

Figure 4:
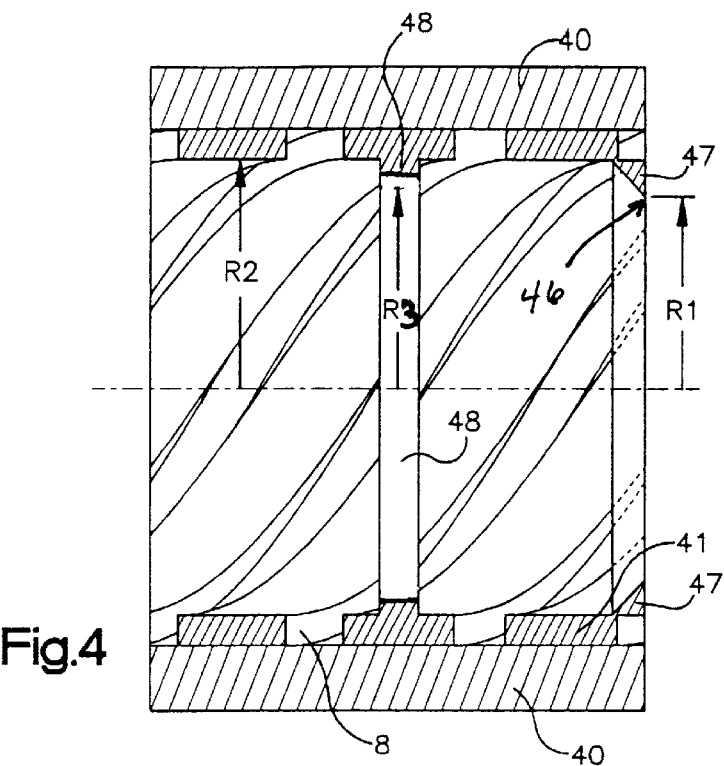
FIG. 4 is a section view of a completed parts feeder housing prior to attachment of an end cap.
Figure 5:
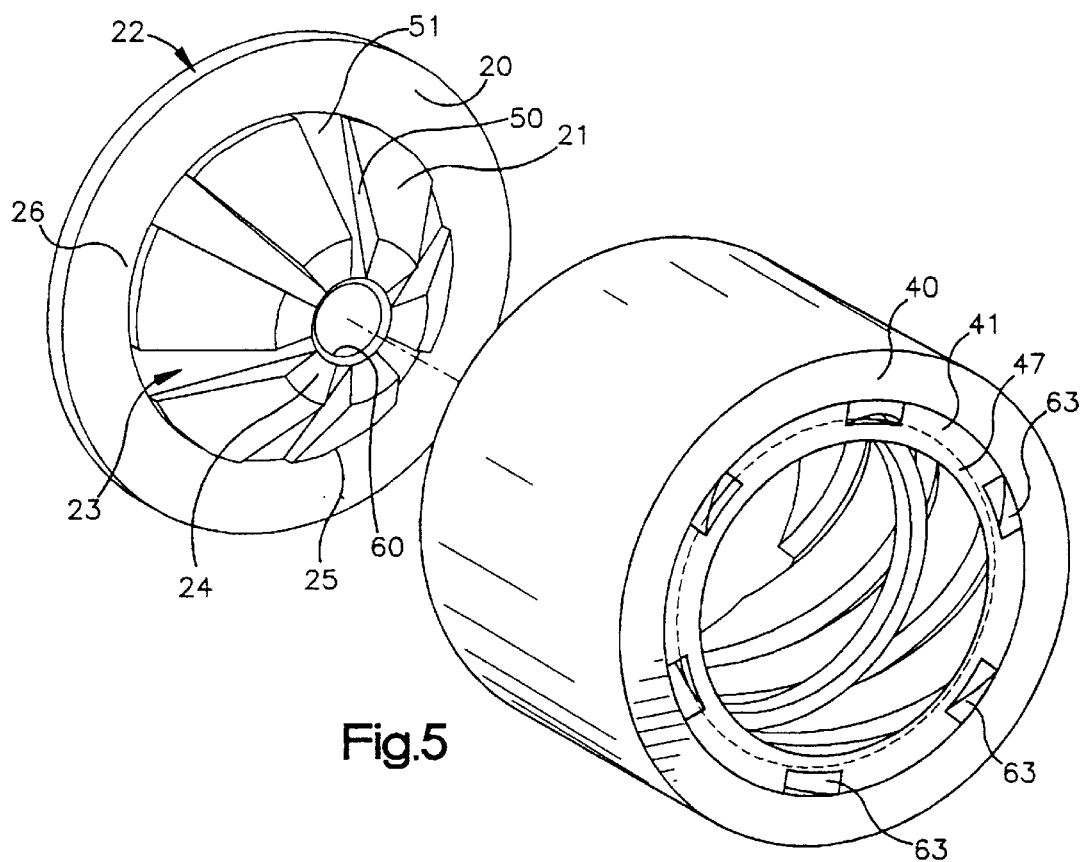
FIG. 5 is an exploded perspective view showing an end cap positioned for mating with an assembled feeder housing.

Referring to FIGS. 3 and 4, in a presently preferred embodiment of the invention, the feeder housing 2 is made from 2 pieces. In this embodiment, the feeder 2 comprises an outer, annular shaped housing element 40 and an inner housing element 41 that defines the grooves 8. The inner housing element 41 is dimensioned so that the inner surface 42 of the outer element 40 engages the outer surface 43 of the inner element 41. The inner element 41 is mechanically fastened to the outer element 40. In the exemplary embodiment, the inner feeder element 41 is secured to the outer feeder housing by small screws.

The outer element 40 is constructed either from a tube of the proper length and diameter to receive the inner element 41 or from a solid piece of material where the opening for receiving the inner element 41 has been machined out by any of many methods known to those skilled in the art.

The inner element 41 may be made from either a solid piece of material or thick walled tube material sized to be received within the outer feeder housing. The inner element 41 is selectively machined along a large percentage of its length to a radius R2. The spiral grooves 8 are cut into the outer surface 43 of the inner element 41 and are spaced equidistant from each other. The center of the inner element 41 is then machined out to a first radius R1. This causes the grooves 8 to extend into the interior cavity of the inner element 41. At selective locations along the length of the inner element 41 the machining is to a different radius R3. This defines one or more interior support rings 48 (only one such ring is depicted in the drawings) that interconnect the intermediate portions of the inner element between the grooves 8.

One of the interconnecting rings is preferably formed at a front end 45 of the inner element 41. This ring is machined to provide a beveled lip 47 around an opening 46 into the front end of the inner cavity 7. This lip reduces the likelihood that parts will bounce out of the opening 46 as well as holding the intermediate pieces of the inner housing segment together. As seen most clearly in FIG. 4, the lip 47 defines the opening 46 to have a radius R1 greater than the radius R3 of the interior support rings 48. At appropriate locations holes are drilled through the walls of the inner housing element 41 to accommodate connectors such as machine screws for attaching together the inner and outer housing elements 40, 41. Other fastening techniques such as welding or glueing are alternate options.

The size, depth and number of the spiral grooves 8 can be varied depending upon the parts to be dispensed. The spiral grooves 8 should be sized so they are wide enough and deep enough that the parts fit easily in the spiral groove without becoming wedged. Additionally, the number of spiral grooves may vary depending on the nature of the parts so long as they equal the number of radial grooves in the inner surface 21 of the end cap 20. Although other arrangements are possible, aligning the spiral grooves 8 with the radial grooves 23 is made easier if both sets of grooves are spaced equidistant from each other.

The cone formed by the inner surface of the end cap 20 is comprised of a cone base 25 with its diameter equal to the outer diameter of the inner cavity, a top 24 and a sloped surface 26. Further, the surface of the cone has a series of radial grooves 23 which run from the top 24 of the cone to its base 25. The depth and width of thee grooves 23 will depend on the parts to be delivered but should be sized large enough so that the parts cannot become wedged in the radial grooves 23. The top 24 of the cone is flattened out and surrounds a centerpassage 60 that extends through the cone. The cone top 24 is flattened at a point where the grooves 23 are spaced apart enough to avoid jamming of the parts in the groove opening 23 delivering parts and a next adjacent groove 23 about to rotate into position for delivering parts.

In the preferred embodiment of the invention, the groove 23 is bounded by walls 50 that are oriented generally perpendicular to a base surface 51 of the groove. However, other embodiments are possible. In an alternate embodiment, the angle formed between the groove walls 50 and the base surface 51 is less than 90°. In this embodiment, fewer parts will enter the grooves 23 but those parts will be less likely to fall out before delivery at the discharge zone 33 and delivery of the parts will occur later, that is, not before the groove has rotated to a completely vertical orientation. In another alternate embodiment, the angle formed by the radial groove wall 50 and the base surface 51 is greater than 90°. In this embodiment, parts will enter the radial groove 2 more easily but will have a greater tendency to spill out prior to delivery at the discharge zone 33 so that delivery will occur earlier, that is, before the groove has rotated to a completely vertical orientation.

Similarly, the slope 26 of the cone in the preferred embodiment is approximately 45 degrees but this slope can be varied depending on the nature of the parts to be isolated. In an alternative embodiment where the slope is steep, the parts will be less likely to fall out of the grooves, but will also be less likely to slide down the groove and into the discharge zone 33. Conversely, in an alternative embodiment where the slope is more shallow, the parts will more easily slide out of the grooves and into the discharge zone 33, but more parts can spill out of the grooves or be delivered before the groove reaches its vertical orientation.

The end cap 20 further defines an opening 60 cut through the end cap 20 perpendicular to the generally planar outer surface 22 of the end cap 20 along the central axis of rotation 61 and extending from the top of the cone 24 through the outer surface 22 of the end cap 20. A device 62 for capturing the parts may be inserted into the discharge zone 33 from either the mouth opening 46 or the opening 60 in the end cap. The type of device for capturing the parts 30 that may be used depends on the nature of the parts 30 but any one of many such devices known to those skilled in the art may be used so long as they are sized to fit through either the opening 60 in the end cap or opening into the cavity defined by the lip 47. The disclosed device 62 has a pluarlity of openings machined into a top surface to capture elongated electrodes of a particular orientation falling through the capture zone 33. Electrodes having other orientations bounce off the device and are returned to the cavity of the parts feeding cylinder.

The end cap 20 engages and is secured to the feeder housing 2 by any one of many ways known to those skilled in the art including screws, commercially available adhesives suitable to the material used to construct the end cap and feeder housing, or suitable welding processes. The end cap must engage the feeder housing such that the spiral grooves 8 meet the radial grooves 23 at the base of the cone 25 and parts are free to move from the spiral grooves 8 into the radial grooves 23.

The devise for rotating the feeder may be any one of many such devices known to those skilled in the art which is capable of rotating the feeder at a constant speed and in both the direction of the arrow 32 and in the reverse direction. These methods may include an electrical motor 31 wherein a motor shaft 80 is coupled to a driven pulley, gears or rollers to rotate the feeder, but many other embodiment are possible. The optimal speed of rotation will depend on the size and weight of the parts and on the number of parts per unit time.

Further, the motor 31 must be capable of rotating the housing 2 in both directions. When the direction of rotation is reversed, the parts follow the spiral grooves from the back end 4 of the feeder housing 2 towards the front end 3 of the feeder housing 2 and out of the apparatus through exit openings 63 formed where the spiral grooves reach the front end 3 of the feeder housing 2 and extend through the beveled lip 47.

In the preferred embodiment the generally cylindrically shaped feeder is rotated while substantially horizontal. However, many other orientations are possible and may be suitable depending on the nature of the parts used, the slope of the cone, and the rate that parts are required to be isolated. Thus while the exemplary embodiment of the invention has been described with a degree of particularity, it is the intent that the invention include all modifications and alterations from the disclosed design falling within the spirit or scope of the appended claims.

What is claimed is:

1. A part feeder comprising:
    a) a generally cylindrically shaped feeder having a feeder housing defining a cavity bounded by an inner surface having one or more spiral grooves extending from a front end to a back end of the inner surface of the feeder housing;
    b) a generally cone shaped end cap dimensioned such that a cone base engages the back end of said cylindrically shaped feeder housing, said end cap having an inner surface which faces the cavity with said inner surface forming one or more parts delivery grooves that extend into the inner surface which extend radially from a cone top to the cone base;
    c) a drive for rotating the cylindrically shaped feeder about an axis of rotation to move parts along the one or more spiral grooves to the one or more parts delivery grooves for delivery to a discharge zone at the end of said one or more parts delivery grooves.

2. A part feeder comprising:
    a) a generally cylindrically shaped feeder having a feeder housing defining a cavity bounded by an inner surface having a plurality of spiral spiral grooves spaced apart from each other and extending from a front end to a back end of the inner surface of the feeder housing;
    b) a generally cone shaped end cap dimensioned such that a cone base engages the back end of said cylindrically shaped feeder housing, said end cap having an inner surface which faces the cavity with said inner surface forming a plurality of parts delivery grooves cut into the inner surface which extend radially from a cone top to the cone base and are spaced about an outer periphery of the end cap to align with corresponding spiral grooves in the feeder housing;
    c) a drive for rotating the cylindrically shaped feeder and the cone shaped end cap about an axis of rotation to move parts along the plurality of spiral grooves to the plurality of radial grooves for delivery to a discharge zone at the end of said parts delivery grooves.

3. The part feeder of claim 2 further comprising a part gathering device for inserting into said discharge zone to capture and remove the parts from said discharge zone.

4. The part feeder of claim 2 further comprising a part gathering device for capturing individual parts in a particular orientation for removal from the part feeder.

5. The part feeder of claim 2 wherein said end cap defines an opening cut through the end cap along a central axis of rotation and extending from the top of the cone through to the outer surface of the end cap.

6. The part feeder of claim 2 wherein the device for rotating said cylindrically shaped feeder rotates said cylindrically shaped feeder in both directions relative to a central axis of the end cap.

7. The part feeder of claim 2 wherein the inner surface of the front end of said cylindrically shaped feeder includes a beveled region that defines an opening into the cavity at a front end of said cylindrically shaped feeder.

8. The part feeder of claim 2 wherein said generally cylindrically shaped feeder housing is comprised of an outer segment having an inner surface, outer surface, front edge and back edge and a cylindrically shaped inner segment having an inner surface, an outer surface, a front end and a back end wherein said cylindrically shaped inner segment is dimensioned to fit within the cylindrically shaped outer segment and has a plurality of spiral grooves spaced from each other, and extending from the front end to the back end of the cylindrically shaped inner segment.

9. The part feeder of claim 8 wherein, the cylindrically shaped outer segment is secured to the cylindrically shaped inner segment.

10. The part feeder of claim 8 wherein the front end of the interior surface of the cylindrically shaped inner segment is a beveled ring that circumscribes an opening into the cavity of said parts feeder housing.

11. The part feeder of claim 8 further comprising a catching device capable of being inserted into said discharge zone for capturing and removing the parts from the parts feeder housing.

12. The part feeder of claim 8 wherein the device for rotating the generally cylindrically shaped feeder is capable of rotating said generally cylindrically shaped feeder in both directions relative to the substantially cylindrically shaped feeder's central axis.

13. A method of isolating parts comprising the steps of:
a) inserting a plurality of the parts to be isolated into an inner cavity of a cylindrically shaped feeder having a plurality of spiral grooves which extend along an inner surface of the feeder;
b) rotating the feeder to move the parts along the plurality of spiral grooves to a back of the cylindrically feeder;
c) aligning radially grooves in a cone at one end of the feeder to intercept parts moving along the spiral grooves;
d) continuing to rotate the cylindrical feeder causing the parts to rotate with the cone until they reach a position where they slide down the groove in which they are captured and fall across an end of the cone; and
e) inserting an interceptor into the stream of parts falling out of the grooves in the cone which catches and removes some of the parts.

14. The method of claim 13 include the additional step of reversing the direction of rotation thereby forcing the parts to move along the spiral grooves to the front end of the cylindrically shaped inner housing and out of the apparatus.

* * * * *